(12) United States Patent
Radatti et al.

(10) Patent No.: US 8,227,008 B1
(45) Date of Patent: Jul. 24, 2012

(54) LOW CARBOHYDRATE, FUNCTIONAL-LIKE FOODS AND SYSTEMS INCORPORATING SAME

(75) Inventors: Marie D. Radatti, Conshohocken, PA (US); Peter V. Radatti, Conshohocken, PA (US)

(73) Assignee: Cybersoft, Inc., Conshohocken, PA (US)

( * ) Notice: Subject to any disclaimer, the term of this patent is extended or adjusted under 35 U.S.C. 154(b) by 217 days.

(21) Appl. No.: 10/691,162

(22) Filed: Oct. 22, 2003

(51) Int. Cl.
*A23L 1/313* (2006.01)

(52) U.S. Cl. .......................... 426/573; 426/657

(58) Field of Classification Search .................. 426/657, 426/573
See application file for complete search history.

(56) References Cited

U.S. PATENT DOCUMENTS

| | | | | |
|---|---|---|---|---|
| 4,876,103 A * | 10/1989 | Kawano et al. | ............... | 426/574 |
| 5,049,401 A * | 9/1991 | Harada et al. | ................. | 426/573 |
| 5,308,636 A * | 5/1994 | Tye et al. | ...................... | 426/573 |
| 5,449,526 A * | 9/1995 | Kawano | ........................ | 426/574 |
| 5,591,471 A * | 1/1997 | Niwano et al. | ................ | 426/440 |
| 5,693,356 A * | 12/1997 | Mandava et al. | ............. | 426/574 |
| 2003/0215559 A1 * | 11/2003 | Mikaelian et al. | ............ | 426/634 |
| 2005/0048183 A1 * | 3/2005 | Yagjian | ........................ | 426/557 |
| 2006/0099324 A1 * | 5/2006 | Aurio et al. | ................... | 426/656 |

* cited by examiner

*Primary Examiner* — Carolyn Paden

(74) *Attorney, Agent, or Firm* — John F. A. Earley, III; Frank J. Bonini, Jr.; Harding, Earley, Follmer & Frailey, P.C.

(57) ABSTRACT

The present invention comprises low carbohydrate, functional-like foods and systems incorporating same. Various embodiments utilizing minimally nutritive sugar substitutes, as well as konjac glucomannan, are disclosed. Methods for weight loss are also disclosed.

14 Claims, No Drawings

LOW CARBOHYDRATE, FUNCTIONAL-LIKE FOODS AND SYSTEMS INCORPORATING SAME

BACKGROUND OF THE INVENTION

1. Field of the Invention

The present invention is related to low carbohydrate, functional-like foods. More particularly, the present invention is related to low carbohydrate, functional-like foods and diets incorporating same.

2. Brief Description of the Related Art

Appropriate nutritional practices may assist an individual in treating various conditions, such as Obesity, Diabetes, Metabolic Syndrome X, Cedric's disease, Heart Disease, Elevated Triglycerides, Kidney Failure, Hypertension, etc. Those appropriate practices may include the ingestion of a category of nutritional products known as functional foods, a term of art used to describe foods that provide both nutritional benefits and other physiological benefits. For example, oat bran is generally accepted as a functional food as it provides soluble fiber that, in additional to nutritional benefits, assists in lowering LDL cholesterol levels.

The difficulty with functional foods is that taste may be contraindicated. That is, although a functional food provides physiological benefits besides mere nutrition, it may not be eaten because taste or texture is found wanting.

Another category of nutritional products that may assist an individual in treating various conditions are dietary products such as low carbohydrate products. For example, excess carbohydrates in an individual's diet may be indicated in various metabolic disorders including obesity, diabetes, heart disease, etc. Moreover, low carbohydrate diets have increasingly become scientifically acceptable.

Again, however, producing foods that are both low carbohydrate and tasteful may be difficult. Carbohydrates, especially starches and sugars, often provide food with satisfying taste.

Therefore, it would be desirable if foods could be produced that combine functional-like food benefits with satisfying taste. It would further be desirable if foods could be produced that combine functional-like food benefits with low carbohydrates and satisfying taste.

SUMMARY OF THE INVENTION

The present invention comprises functional-like foods and systems incorporating same. Embodiments comprise recipes. Low carbohydrate embodiments are disclosed as well.

DETAILED DESCRIPTION OF THE PREFERRED EMBODIMENTS

The present invention comprises functional-like foods and systems incorporating functional foods. Preferred embodiments comprise low carbohydrate foods as well. Various embodiments comprise sauces, dressings, entrees, and deserts providing fats, proteins and possibly carbohydrates, as further described below. Those embodiments with carbohydrates may supply those carbohydrates as a water soluble or insoluble fiber or other form which has minimal effect on elevating blood sugar.

It should be understood that the term "net carbohydrate" is used herein to describe those carbohydrate substances that provide more than minimal blood sugar concentration post ingestion, similar to the initial impact of foods low on a glycemic index. So, for example, dietary fiber, a carbohydrate, is not included in a determination of "net carbohydrates", as fiber has little or no effect on blood sugar concentration post-elevation. Preferred low carbohydrate embodiments, therefore, as defined herein, contain 5 grams or less net carbohydrates per serving.

Other preferred embodiments may provide greater than 5 grams of carbohydrates per serving, such as those embodiments wherein the functional characteristics of the embodiment provides benefits deemed to outweigh carbohydrate concerns.

The ingredients of the preferred embodiments may also include non- or minimally-nutritive sugar substitutes or sweeteners such as sucralose, saccharin, cyclamates, stevioside, etc. There is little or no effect on blood sugar as a result. Additionally, in certain embodiments, water soluble or insoluble high fiber flours or other substrates may be incorporated in various ingredients (e.g. konjac glucomannan) which may minimally elevate blood sugar.

Embodiments may further comprise mechanical features promoting weight loss. For example, in certain embodiments where konjac glucomannan is used, water is absorbed and thus the konjac glucomannan expands to as much as 50 times its volume or more. Thus, once ingested, hydrated konjac glucomannan may contribute to a feeling of fullness—a mechanical feature—and the individual is less likely to overeat.

Embodiments comprise single servings, meals and nutritional programs. The examples that follow are presented to further illustrate and explain the invention and should not be taken as limiting in any regard. Unless stated otherwise, all percentages are by weight.

Example I

A dressing having improved texture and flavor in accordance with the invention is prepared using a minimally-nutritive sugar substitute, in particular a minimally-nutritive sugar substitute, sucralose, marketed by McNeil Specialty Products Company under the trademark Splenda. A dressing using this sugar substitute is prepared by blending, at an extremely low rate, 1 Gallon of Mayonnaise, 6 oz of Tomato Paste, and 14 tablespoons of sucralose. These ingredients are blended until a relatively homogenous mixture of all the ingredients is provided. One quarter cup of water or oil is added at regular intervals. The amount of water or oil added may be varied according to desired consistency, however, in the preferred embodiments about 2 cups is to be added.

Other additives may be added as well. For example, stabilizers as known in the art, e.g., pectin, locust bean gum, xanthan gum, etc. may be added in a ratio of up to 1.0%; 0% to 1.0% citric acid or malic acid as known in the art may be added in order to adjust the pH; preservatives as known in the art, e.g. 0.1% potassium sorbate, may be added as well; bulking agents as known in the art, e.g., cellulose, maltodextrin, polydextrose, konjac glucomanman, etc. may be added as well, etc.

Nutritionally, the foregoing example provides a low carbohydrate food that may be used as a dressing, spread, etc. The product produced in accordance with the foregoing example is a semi-liquid having a creamy texture and enhanced flavor relative to low carbohydrate dressings as known in the art.

A solid spread is produced by increasing konjac or another bulking agent in the foregoing example.

The foregoing example may be used as a dressing or otherwise as desired. The following examples illustrate uses.

Example II

A high protein, low carbohydrate spread having improved texture and flavor in accordance with the invention is prepared using a minimally-nutritive sugar substitute, in particular a minimally-nutritive sugar substitute, sucralose, marketed by McNeil Specialty Products Company under the trademark Splenda.

A number of boiled eggs, with the number depending upon volume desired, are blended with the dressing from Example I above. Additional Splenda and salt are added to desired taste. Blending is at low shear until a relatively homogeneous mixture of all the ingredients is reached.

Other additives may be added as well. For example, stabilizers as known in the art, e.g., pectin, locust bean gum, xanthan gum, etc. may be added in a ratio of up to 1.0%; 0% to 1.0% citric acid or malic acid as known in the art may be added in order to adjust the pH; preservatives as known in the art, e.g. 0.1% potassium sorbate, may be added as well; bulking agents as known in the art, e.g. cellulose, maltodextrin, polydextrose, konjac glucomannan, etc. may be added as well, etc.

Nutritionally, the foregoing example provides a high protein, low carbohydrate food that may be used as a filling, etc. The product produced in accordance with the foregoing example is a semi-solid having a creamy texture and enhanced flavor relative to high protein, low carbohydrate foods as known in the art.

Example III

A functional-like, low carbohydrate food with mechanical features and improved texture and flavor in accordance with the invention is prepared using a admixture of konjac glucomannan.

Konjac glucomannan is used herein to refer to the substance also known as konjac flour. konjac glucomannan is a soluble dietary fiber with similarities to pectin in structure and function. konjac glucomannan is obtained, by methods known in the art, e.g. grinding, milling, etc. from the tubers of various Amorphophallus species and is primarily comprised of a hydrocolloidal polysaccharide, known as glucomannan.

Embodiments of the present invention subsequently process konjac glucomannan through mechanical and/or chemical (including enzymatic methods) in order to decrease the "gumminess" traditionally associated with konjac gluucomannan. That gumminess, caused by long chain associations of the glucomannan fibers, may have made the use of konjac glucomannan less than appealing. For example, the traditional gumminess has led to increased chewing in order to ingest konjac glucomannan foods.

A preferred method of decreasing the gumminess traditionally associated with konjac glucomannan is to add an animal based protein concentrate (such as fish protein concentrate or flours made from eggs, pork rinds, pork, beef, chicken, turkey, etc). In the especially preferred embodiments, glucomannan is mixed with the animal based protein concentrate in a varying ratio by volume, at an extremely low blending rate until a relatively homogenous mixture is provided. The ratio varies depending upon the predetermined desired texture or desired other properties (e.g., water volume, etc.,) so for example, a ratio may be 10:1 glucomannan to protein for a first predetermined texture and 5:1 glucomannan to protein for a second predetermined texture.

When heated, at temperatures above 100 degrees Celsius, the interaction between konjac glucomannan and protein leads to a less gummy material that can be used in various foods. The functional-like characteristics of konjac glucomannan, including its mechanical characteristics as noted above, also provide benefits to the user.

Non- or minimally-nutritive sweeteners and/or salt may be added as desired before or while heating. Other additives may be combined with the product of the example as well. For example, stabilizers as known in the art, e.g., pectin, locust bean gum, xanthan gum, etc. may be added in a ratio of up to 1.0%; 0% to 1.0% citric acid or malic acid as known in the art may be added in order to adjust the pH; preservatives as known in the art, e.g. 0.1% potassium sorbate, may be added as well; bulking agents as known in the art, e.g., cellulose, maltodextrin, polydextrose, etc. may be added as well, anticaking agents as known in the art may be added, etc.

Nutritionally, the foregoing example provides a high fiber, low carbohydrate substance that may be used as a flour, base, etc. An exemplary use of the animal based konjac product in Example III may be used to make a dough. The dough preferably includes konjac glucomannan and animal based protein concentrate, and has gas bubbles introduced into the dough using mechanical and/or chemical methods. One example of a mechanical method involves pressurization of the dough. Another example of a mechanical method involves high speed whipping of the dough. The following example illustrates uses.

An exemplary use of the animal based konjac product in Example III may be used to make a dough. The dough preferably includes konjac glucomannan and animal based protein concentrate, and has gas bubbles introduced into the dough using mechanical and/or chemical methods. One example of a mechanical method involves pressurization of the dough. Another example of a mechanical method involves high speed whipping of the dough.

Example IV

A functional-like, low carbohydrate bread with mechanical features and improved texture and flavor in accordance with the invention is prepared using an embodiment of the foregoing example of konjac glucomannan.

Breads may be made using leavening agents. Some examples are given below. Alternatively, unleavened bread may be made using the foregoing example of konjac glucomannan. Unleavened flatbreads are as known in the art, e.g. tortillas, matzos, etc.

In the preferred embodiments, yeast is not used to leaven the bread, as yeast, in the fermentation process, requires undesirable carbohydrates. Accordingly, mechanical and/or chemical methods are used to introduce gas into the dough for leavening.

Mechanical methods include pressurization of the dough. In especially preferred embodiments, the dough is placed in a pressure chamber. The dough is then pressurized with the degree of pressurization dependant upon ambient pressure and humidity, but in any event with pressurization sufficient to have gas bubbles infuse the dough. Upon depressurization, removal from the chamber, and heating, the gas bubbles introduced into the dough via pressurization expand as the dough is heated, thus creating desired pockets in the bread.

In other embodiments, high speed whipping of the dough rather than, or in addition to, pressurization, may be utilized in order to create gas pockets prior to baking.

Chemical methods include the use of baking soda and/or baking powder. These are used in conventional baking in the formation of quick breads. Their use in various embodiments is according to the quantities and guidelines provided in conventional baking.

Water, milk and/or oil is added at regular intervals. The amount of water, milk or oil added may be varied according to desired consistency. In the course of the mixing process, or during baking, non- or minimally-nutritive sweeteners and/or salt may be added as desired. Other additives may be added as well. For example, flavors, colors, etc. may be added. Also, stabilizers as known in the art, e.g., pectin, locust bean gum, xanthan gum, etc. may be added in a ratio of up to 1.0%; 0% to 1.0% citric acid or malic acid as known in the art may be added in order to adjust the pH; preservatives as known in the art, e.g. 0.1% potassium sorbate, may be added as well; bulking agents as known in the art, e.g., cellulose, maltodextrin, polydextrose, etc. may be added as well, etc.

Example V

A functional-like, low carbohydrate pizza with mechanical features and improved. texture and flavor in accordance with the invention is prepared using an embodiment of the foregoing dough admixture of konj ac glucomannan.

A pizza shell is shaped as desired. Various ingredients, e.g., Tomato, Mozzarella Cheese Red Pepper, Basil Leaves, Onion, Garlic, etc. may be placed on top of the pizza shell. Cheese and Olive Oil are sprinkled on the shell as well. The pizza is then cooked at an appropriate temperature to desired taste and texture.

Example VI

Functional-like, low carbohydrate imitation seafood with mechanical features and improved texture and flavor in accordance with the invention is prepared using an embodiment of the foregoing admixture of konjac glucomannan.

Fish proteins, (e.g., surami) is used in combination with the foregoing admixture of konjac and binding agents (e.g. tetrasodium pyrophosphate, edible glues, including milk based protein glues, etc.) to provide an edible substance. Various desired flavors are added as well. For example, imitation crab embodiments utilize crab extract as well as crab-like coloring. Other seafood embodiments, (e.g. lobster, scallops, shrimp, etc.) may be provided as well.

Embodiments may be developed in sheet form. For example, a layer of konjac admixture, followed by a layer of protein, followed by a layer of konjac admixture, etc. These layers are fixed to each other by the use of a binding agent. Other methods may be used as well, may then be formed, by cutting, extraction, etc. as desired, such as crab claws, crab legs, lobster tails, etc.

Other additives may be added as well. Non- or minimally-nutritive sweeteners and/or salt may be added as desired. For example, stabilizers as known in the art, e.g., pectin, locust bean gum, xanthan gum, etc. may be added in a ratio of up to 1.0%; 0% to 1.0% citric acid or malic acid as known in the art may be added in order to adjust the pH; preservatives as known in the art, e.g. 0.1% potassium sorbate, may be added as well; bulking agents as known in the art, e.g., cellulose, maltodextrin, polydextrose, etc. may be added as well, etc.

It should be noted that these embodiments provide a desirable high protein, low carbohydrate functional-like food in contradistinction to the imitation seafoods as previously known in the art. Previously, for example, imitation seafood primarily comprised various sugars and/or starches, for flavoring, binding, volumes and the like. With the preferred seafood embodiments, however, the sugars and/or starches are eliminated which provides desirably low carbohydrate embodiments.

Example VII

A dessert having improved texture and flavor in accordance with the invention is prepared using a minimally-nutritive sugar substitute, in particular a minimally-nutritive sugar substitute, sucralose, marketed by McNeil Specialty Products Company under the trademark Splenda.

A dessert using this sugar substitute is prepared by blending, at an extremely low rate, 12 oz. of Whipping Cream, 8 drops of artificial concentrated flavoring as desired, and sucralose to desired taste. Food coloring, of a type known in the art, may be added as well. The ingredients are whipped until a relatively homogenous mixture of all the ingredients is provided. A fairly thick and firm consistency results. Water may be added as well if a different consistency is desired.

Other additives may be added as well. For example, stabilizers as known in the art, e.g., pectin, locust bean gum, xanthan gum, etc. may be added in a ratio of up to 1.0%; 0% to 1.0% citric acid or malic acid as known in the art may be added in order to adjust the pH; preservatives as known in the art, e.g. 0.1% potassium sorbate, may be 'added as well; bulking agents as known in the art, e.g., cellulose, maltodextrin, polydextrose, etc. may be added as well, etc.

Nutritionally, the foregoing example provides a low carbohydrate dessert, spread, etc. The product produced in accordance with the foregoing example is a semi-solid having a creamy texture and enhanced flavor relative to low carbohydrate desserts, spreads, etc. as known in the art.

Freezing may be desired as well. Additionally, embodiments may include pressurization for ease of dispensation, e.g. a pressurized dispensing can.

It should also be noted that various embodiments may be in prepackaged form, as those forms are known in the art, e.g., TV Dinner-type embodiments, Bottled Sauce embodiments, Packaged, Canned Good, etc., so that portion size; nutrients, carbohydrates, etc. are controlled.

Although the present invention has been described with respect to various specific embodiments, various modifications will be apparent from the present disclosure and are intended to be within the scope of the following claims.

We claim:

1. An improved dough for cooking into a food product, said improved dough comprising:
    an admixture consisting of
        konjac glucomannan and
        animal based protein concentrate,
    wherein said admixture comprises konjac glucomannan and animal based protein concentrate in a ratio by volume which provides said admixture with a predetermined texture, which admixture has been heated to above 100 degrees Celsius, wherein said predetermined admixture texture consists of an improved texture for facilitating use of said admixture as a component of said dough;
    wherein said admixture comprises a homogeneous mixture of said konjac glucomannan and said animal based protein concentrate, and
    wherein said dough includes gas bubbles that have been introduced into said dough using mechanical methods comprising pressurization of dough.

2. A dough according to claim 1 further comprising insoluble fiber as a component of said dough, wherein said admixture comprises at least one component of said dough and wherein said insoluble fiber comprises at least one other component.

3. A dough according to claim 1 further comprising a bulking agent as a component of said dough, wherein said admixture comprises at least one component of said dough and wherein said bulking agent comprises at least one other component of said dough.

4. A food prepared from the dough of claim 1, wherein said animal based protein concentrate is selected from the group consisting of fish protein concentrate, eggs, pork rinds, pork, beef, chicken, and turkey.

5. The improved dough of claim 1, including at least one additional component in combination with the admixture, said improved dough comprising a formation that includes said texturized admixture and said at least one additional component, wherein said improved dough has a texture that is non gummy.

6. The improved dough of claim 1, wherein said texturized admixture texture consists of a flour texture.

7. The improved dough of claim 6, wherein said dough further comprises a moisture additive.

8. The improved dough of claim 7, said moisture additive is selected from the group consisting of water, milk, and oil.

9. The improved dough of claim 1, wherein, in addition to said admixture with said predetermined texture, said component of said dough further includes a stabilizer.

10. An improved dough for cooking into a food product, said improved dough comprising:
   an admixture consisting of
      konjac glucomannan and
      animal based protein concentrate,
   wherein said admixture comprises konjac glucomannan and animal based protein concentrate in a ratio by volume which provides said admixture with a predetermined texture, which admixture has been heated to above 100 degrees Celsius, wherein said predetermined admixture texture consists of an improved texture for facilitating use of said admixture as a component of said food product; and
   wherein gas bubbles have been introduced into said dough using chemical methods comprising baking soda and/or baking powder.

11. A food product according to claim 10 further comprising insoluble fiber.

12. A food product according to claim 10 further comprising a cellulose bulking agent.

13. The improved dough of claim 10, including at least one additional component to produce the dough, and wherein said at least one additional component comprises a bulking agent, wherein said bulking agent component comprises at least one ingredient of said dough and wherein said admixture comprises at least one other ingredient of said dough.

14. An improved flour for use in making cooked food products, said improved flour comprising:
   konjac glucomannan and
   animal based protein concentrate,
   wherein said flour comprises konjac glucomannan and animal based protein concentrate in a ratio by volume which provides said flour with a predetermined texture, the mixture of said konjac glucomannan and said animal based protein concentrate being heated to above 100 degrees Celsius, wherein said flour is used as a component of a cooked food product.

* * * * *